July 7, 1970 J. W. KINNAVY 3,519,171
DISPENSING CONTAINER WITH METERING
AND TIME DELAY VALVE MECHANISM
Filed April 26, 1968
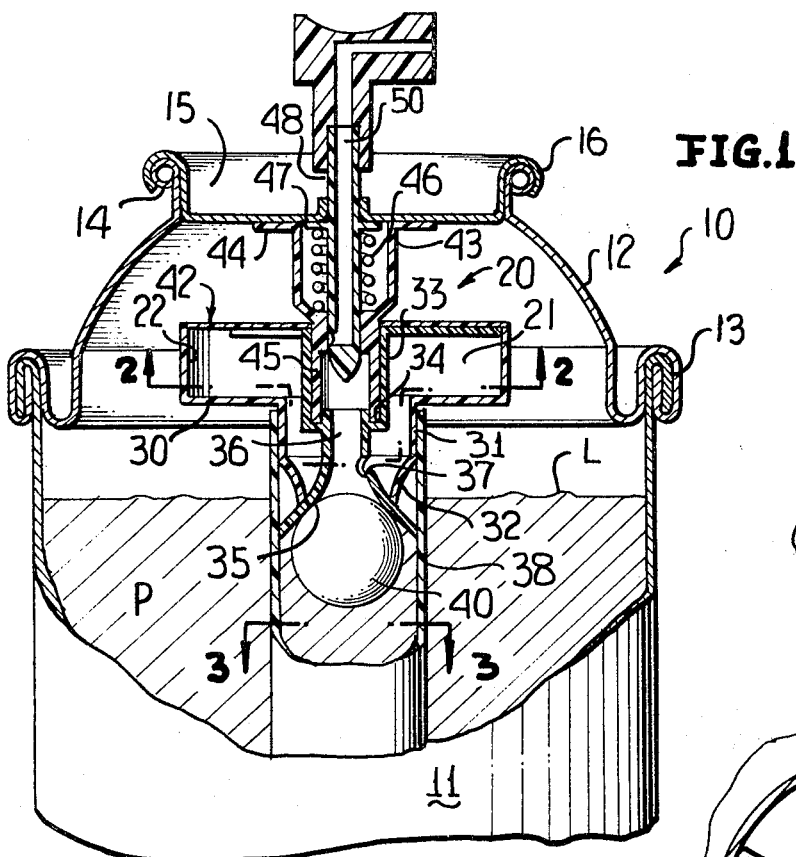
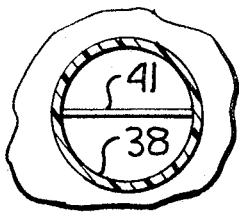
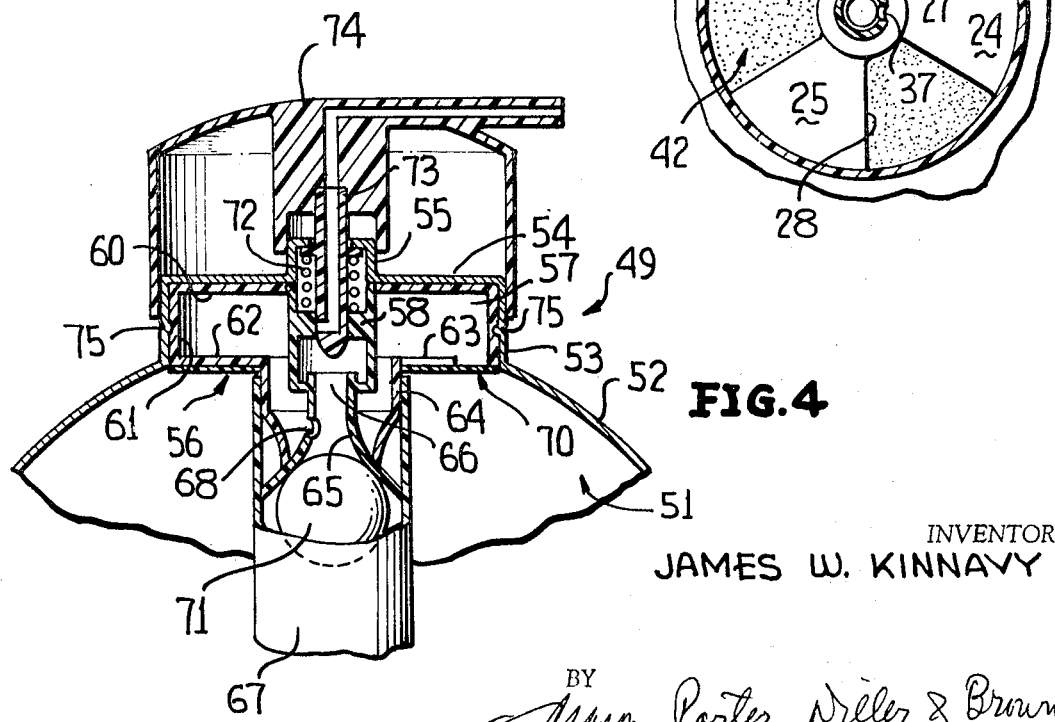
INVENTOR
JAMES W. KINNAVY
BY
Mason, Porter, Diller & Brown
ATTORNEYS

United States Patent Office 3,519,171
Patented July 7, 1970

3,519,171
DISPENSING CONTAINER WITH METERING AND TIME DELAY VALVE MECHANISM
James W. Kinnavy, Westmont, Ill., assignor to Continental Can Company, Inc., New York, N.Y., a corporation of New York
Filed Apr. 26, 1968, Ser. No. 724,398
Int. Cl. B65d 47/00
U.S. Cl. 222—394          10 Claims

ABSTRACT OF THE DISCLOSURE

This disclosure relates to an aerosol-type container which includes a metering and time delay valve mechanism. The valve mechanism includes a passage which can be closed by a ball-like valve member under the influence of a pressurized product. A chamber having a permeable wall portion surrounds the passage and after a dispensing operation the pressure in the chamber is balanced to that in a dip tube by propellant migrating through the permeable wall portion, thereby establishing a time delay between successive dispensing operations dependent upon the time required for the propellant to migrate into the chamber and the passage after which the valve member will descend to the bottom of the dip tube to permit a subsequent metered dispensing operation.

---

Conventional aerosol-type dispensing containers include in certain applications means for metering a predetermined quantity of a product under the influence of a pressurized propellant. One typical example of such conventional dispensers generally includes a dip tube having a spherical valve member which is normally positioned adjacent a lower end of the dip tube. Upon the depression of a conventional valve mechanism, the propellant forces the product upwardly in the dip tube and outwardly to the atmosphere until such time as the spherical valve member seals a valve seat at an upper end portion of the dip tube. At this point, even though the valve mechanism is still in its dispensing position, further dispensing of the product to atmosphere is prevented by the now seated valve member.

Upon the release of the valve mechanism, the spherical valve member substantially immediately begins to descend to the lower end of the dip tube. During the time the valve member descends and upon reaching the bottom of the dip tube, the valve mechanism can again be operated to dispense additional metered amounts of the product.

Such dispensers are therefore quite appropriate for many purposes which require the dispensing of a predetermined quantity of the product during each dispensing operation. However, such dispensers cannot be used where it is desired to have a predetermined time delay between successive dispensing operations. For example, patent and prescription medicines in liquid form are generally administered in not only predetermined quantities but in many cases there is a necessary or desirable time delay between succeeding dosages, particularly when the medicine is of the type which may be habit forming or injurious if taken in too great a quantity or smaller quantities taken in close relationship timewise of each other. It may be desirable, for example, to administer liquid cough or cold medicine at a dosage of one or two teaspoonfuls each two, four or six hours. Conventional dispensers of the type heretofore described could relatively accurately dispense a predetermined quantity but could not effect a predetermined and repetitious time delay between successive dispensing operations.

In accordance with the foregoing, it is a primary object of this invention to provide a novel dispenser which not only can dispense a predetermined quantity of a particular product, but includes means to effect a predetermined time delay between successive dispensing operations.

A further object of this invention is to provide a novel dispensing mechanism which includes a housing adapted to receive a pressurized dispensable product, passage means in the housing through which the product is adapted to pass during a dispensing operation, valve means for opening and closing the passage means to atmosphere, a valve member in a dip tube movable between a first position closing fluid communication between the dip tube and the passage means, and a second position opening fluid communication between the dip tube and the passage means, and means for timewise regulating the introduction of propellant into the passage means when the valve member is in the first position to equalize the pressure on both sides of the valve member after a predetermined time period to thereby establish a time delay before the valve member moves to the second position dependent upon the time required to introduce the propellant into the passage means through the regulating means.

Another object of this invention is to provide a novel dispensing mechanism of the type heretofore described wherein the regulating means is a permeable member through which the propellant can migrate from the housing into the passage means.

With the above and other objects in view that will hereinafter appear, the nature of the invention will be more clearly understood by reference to the following detailed description, the appended claimed subject matter, and the several views illustrated in the accompanying drawing.

In the drawing:

FIG. 1 is a fragmentary side elevational view of a dispenser constructed in accordance with this invention with a portion thereof broken away and shown in section for clarity, and illustrates a spherical valve member cutting off communication between a dip tube and a product dispensing passage, and a chamber which is defined in part by a permeable member through which propellant can migrate to balance the pressure on opposite sides of the valve member after a predetermined time delay.

FIG. 2 is a sectional view taken generally along line 2—2 of FIG. 1, and more clearly illustrates the permeable member closing a plurality of openings in a wall of the chamber.

FIG. 3 is a sectional view taken generally along line 3—3 of FIG. 1, and illustrates means for preventing the spherical valve member from dropping out of the lower end portion of the dip tube.

FIG. 4 is a fragmentary sectional view of another dispenser similar to the dispenser of FIG. 1, and illustrates an alternate manner of securing the metering and time delay mechanism to the dispenser body.

Referring to FIG. 1 of the drawing, a novel dispensing container constructed in accordance with this invention is generally designated by the reference numeral 10 and includes a tubular metallic container body 11 having a closed bottom end (not shown). A dome-shaped closure 12 is secured to the body 11 by a conventional double seam 13. The closure 12 terminates in a curl 14 to which is attached a valve cap 15 by a conventional crimped curl 16. The valve cup 15 carries a metering and time delay valve mechanism which is generally designated by the reference numeral 20.

The metering and time delay mechanism 20 includes a generally annular chamber 21 defined by an annular wall 22, a top wall formed by three ribs 23 through 25 between which are openings 26 through 28, a lower annular wall 30 and a cylindrical wall 31 which flares radially inwardly and downwardly at 32. The chamber 21 is additionally defined by an inner cylindrical wall 33 having an upwardly opening annular seat 34 and terminating at a radially downwardly and outwardly flared wall 35 which defines a passage 36 having a vent or aspirator hole 37 opening into the chamber 21. A dip tube 38 surrounds and is conventionally secured to the wall 31, and within the dip tube 38 is a spherical valve member 40 which is adapted for movement from a normal position resting upon a rod 41 (FIG. 3) at the lower end of the dip tube 38 to the position shown in FIG. 1 closing off fluid communication between the interior of the dip tube 38 and the passage 36.

Means 42 in the form of an annular permeable membrane is adhesively secured above the ribs 23 through 25 (FIGS. 1 and 2) to close the openings 26 through 28. The function of the permeable membrane 42 is to permit propellant located within the body 11 to balance the pressure at both sides of the valve member 40 when positioned as shown in FIG. 1 to cause the return thereof after a predetermined time delay to its normal position upon the rod 41, as will be more apparent hereafter during the description of the operation of the dispensing container 10.

The metering and time delay mechanism 20 is suspended from the valve cup 15 by means of a tubular member 43 having a radially outwardly directed upper flange 44 which is adhesively secured to an end panel (unnumbered) of the valve cup 15. A lower end portion 45 of the tubular member 43 is force fit or otherwise secured within the cylindrical wall 33 such that the mechanism 20 is suspended from the tubular member 43.

A spring 46 within the tubular member 43 acting against a flange 47 of a valve stem 48 normally urges the valve stem to its nondispensing position (FIG. 1) at which time fluid communication between the passage 36 and atmosphere through a passage 50 of the valve stem 48 is cut off.

In the following description of the operation of the dispenser 10, it will be assumed that the spherical valve member 40 is seated upon the rod 41 at the bottom end of the dip tube 38 and that a liquid product P is housed in the body 11 and has an upper level L. The liquid level of the product P is, of course, also at the same height within the interior of the dip tube 38. It will also be assumed that there is propellant in the head space of the can body 11 above the liquid level L.

A dispensing operation is performed simply by depressing the stem 48 downwardly to place the passage 50 in fluid communication with the passage 36. The pressurized propellant forces the product in the dip tube outwardly to atmosphere through the passage 36 and the passage 50 of the valve stem 48. As the product moves upwardly in the dip tube 38, the spherical valve member 40 is carried upwardly until it contacts and seats against the flared portion 35 whereupon no further product will be communicated through the passage 50 even though the stem 48 is still depressed. It will be appreciated that the time required for the valve member 40 to move from its seated position upon the rod 41 to its sealed position shown in FIG. 1 is an effective manner of obtaining a predetermined quantitywise dispensing of the product P.

Assuming that the stem 48 is now released, there is created a pressure differential between the interior of the chamber 21 and the passage 36 on one hand and the interior of the body 11 and the dip tube 38 below the valve member 40 on the other hand. The pressure within the chamber 21 and the passage 36 is approximately atmospheric while the pressure within the can body 11 and dip tube 38 beneath the valve member 40 is substantially above atmospheric pressure depending, of course, upon the pressurized propellant in the head space. The propellant in the head space therefore begins to permeate the permeable member 42 and after a predetermined period of time, the pressure of the propellant in the chamber 21 and the passage 36 is equal to the pressure beneath the valve member 40. Due to this pressure balancing above and below the valve member 40, the weight of the latter causes the valve member to unseat and drop until seated upon the rod 41. At this time another dispensing operation can be performed by again depressing the stem 40. It will thus be readily apparent from the foregoing that the time between successive dispensing operations is controlled by the time required for the propellant to permeate the permeable member 42 sufficiently to equalize the pressure on both sides of the valve member 40 when in the sealed position shown in FIG. 1. Therefore, by varying the thickness of the permeable member 42, the size of the openings 26–28, etc., the time delay desired can be regulated with relative accuracy.

Reference is now made to FIG. 4 of the drawing which illustrates another dispenser 49 which is similar to the dispenser 10 and includes a can body 51 having an upper integral closure defined by a dome-like portion 52, a peripheral skirt 53, an end panel 54 and an upset apertured portion 55.

A metering and time delay mechanism 56 is supported within the can body 51 and includes a chamber 57 defined by an inner generally cylindrical wall 58, an upper annular wall 60, a peripheral wall 61, a lower wall (unnumbered) defined by a plurality of ribs 62, 63, etc., between which are spaces corresponding to the spaces 26–28 of FIG. 2, a cylindrical wall 64 and a terminal end portion thereof which flares radially inwardly and downwardly. The chamber 57 is further defined by a lower flared portion 65 of the wall 58 which additionally defines a passage 66 in fluid communication with a dip tube 67 and the interior of the chamber 57 by means of a vent or aspirator hole 68. An annular permeable member 70 is conventionally secured in underlying relationship to the ribs 62, 63 and closes the openings therebetween. The permeable member 70 functions identically to that heretofore described relative to the permeable member 42 of the dispenser 10.

Though not illustrated, the dip tube 67 also includes a rod corresponding to the rod 41 of the dip tube 38 which provides a stop for a spherical valve member 71.

A spring 72 normally urges a valve stem 73 in a dispensing cap 74 to the position illustrated in FIG. 4.

A major difference between the dispensers 10, 49 is the provision in the latter of the permeable member 70 adjacent the upper end of the dip tube 67 which provides a more compact arrangement than that illustrated in FIG. 1. A plurality of crimps 75 in the peripheral wall 53 support the mechanism 56 in the position illustrated with the permeable member 70 exposed to propellant within the interior of the can body 51. Thus, upon performing a dispensing operation in the manner heretofore described relative to the dispenser 10, a time delay is effected after the valve member 71 reaches the position shown in FIG. 4 dependent again upon the time required for the propellant in the can body 51 to permeate through the permeable member 70 and enter the chamber 57 and the passage 66 through the opening between the ribs 62, 63 and the vent opening 68. When the pressure is equalized on both sides of the valve member 71, the latter again descends by gravity to permit subsequent dispensing operations.

While preferred forms and arrangements of parts have been shown in illustrating the invention, it is to be clearly understood that various changes in details and arrangement of parts may be made without departing from the spirit of the invention.

I claim:

1. A time delay mechanism particularly adapted for dispensing products under the influence of a propellant comprising means defining a passage through which a product is adapted to pass under the influence of a propellant, means defining a chamber exteriorly of said passage means, means placing said chamber and passage means in fluid communication, and regulating means for time-wise regulating the introduction of propellant into said chamber to equalize the pressure in the passage means to that of the propellant exteriorly thereof during a period of time following each dispensing of said product thereby establishing a time delay between successive dispensing operations dependent upon the time required to introduce the propellant into the chamber through said regulating means.

2. The time delay mechanism as defined in claim 1 wherein said regulating means is a permeable member through which the propellant can pass into said chamber means.

3. The time delay mechanism as defined in claim 1 including means for dispensing a predetermined quantity of the product during each dispensing operation.

4. The time delay mechanism as defined in claim 1 wherein said regulating means is a permeable member through which the propellant can pass into said chamber means, and means for dispensing a predetermined quantity of the product during each dispensing operation.

5. The time delay mechanism as defined in claim 2 including a dip tube forming a continuation of said passage means, a valve member in said dip tube movable between a first position closing fluid communication between said dip tube and passage means and a second position opening fluid communication between said dip tube and passage means, and valve means for placing said passage means in fluid communication with the atmosphere whereby product movement in said dip tube causes the valve member to move from said second to said first position during a dispensing operation.

6. The time delay mechanism as defined in claim 5 including means for preventing movement of said valve member beyond the second position in a direction away from said passage means.

7. The time delay mechanism as defined in claim 5 wherein said chamber means surrounds said passage means and includes a wall having at least a single opening therein, and said permeable member closes said single opening.

8. The time delay mechanism as defined in claim 6 wherein said chamber means surrounds said passage means and includes a wall having at least a single opening therein, and said permeable member closes said single opening.

9. A dispensing mechanism comprising a housing adapted to receive a pressurized dispensable product, passage means in said housing through which the product is adapted to pass during a dispensing operation, valve means for opening and closing said passage means to atmosphere, a dip tube defining an extension of said passage means, a value member in said dip tube movable between a first position closing fluid communication between said dip tube and passage means and a second position opening fluid communication between said dip tube and passage means, and means for time-wise regulating the introduction of propellant into said passage means when said valve member is in said first position to equalize the pressure in the passage means to that of the housing thereby establishing a time delay before said valve member moves to the second position dependent upon the time required to introduce the propellant into the passage means through said regulating means.

10. The dispensing mechanism as defined in claim 9 wherein said regulating means is a permeable member through which the propellant can pass into said passage means.

References Cited

UNITED STATES PATENTS 2,518,259  8/1950  Stevenson _____ 222—477 X

STANLEY H. TOLLBERG, Primary Examiner

U.S. Cl. X.R.

222—477